(12) United States Patent
Liu (10) Patent No.: US 10,021,634 B2
(45) Date of Patent: Jul. 10, 2018

(54) METHOD AND DEVICE FOR SWITCHING SIM CARDS OF COMMUNICATION TERMINAL AND COMPUTER STORAGE MEDIUM

(71) Applicant: NUBIA TECHNOLOGY CO., LTD., Shenzhen (CN)

(72) Inventor: Yi Liu, Shenzhen (CN)

(73) Assignee: NUBIA TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/506,782

(22) PCT Filed: Aug. 4, 2015

(86) PCT No.: PCT/CN2015/085991
§ 371 (c)(1),
(2) Date: Apr. 19, 2017

(87) PCT Pub. No.: WO2016/029781
PCT Pub. Date: Mar. 3, 2016

(65) Prior Publication Data
US 2017/0245209 A1    Aug. 24, 2017

(30) Foreign Application Priority Data

Aug. 25, 2014    (CN) .......................... 2014 1 0422317

(51) Int. Cl.
*H04W 4/00* (2018.01)
*H04W 48/18* (2009.01)
(Continued)

(52) U.S. Cl.
CPC ......... *H04W 48/18* (2013.01); *H04L 61/1594* (2013.01); *H04M 3/42195* (2013.01); *H04W 88/06* (2013.01)

(58) Field of Classification Search
CPC .... H04W 60/005; H04W 92/08; H04W 88/06
(Continued)

(56) References Cited

U.S. PATENT DOCUMENTS

2008/0318621 A1    12/2008 Fan et al.
2010/0105433 A1    4/2010 Lin et al.
(Continued)

FOREIGN PATENT DOCUMENTS

CN    102065583 A    5/2011
CN    102333161 A    1/2012
(Continued)

OTHER PUBLICATIONS

The World Intellectual Property Organization (WIPO) International Search Report and Written Opinion for PCT/CN2015/085991 dated Oct. 29, 2015 10 Pages.

*Primary Examiner* — Kiet Doan
(74) *Attorney, Agent, or Firm* — Anova Law Group, PLLC (57) ABSTRACT

Disclosed are a method and device for switching SIM card of a communication terminal and a computer storage medium. The method comprises: identifying a called number of a missed call or identifying an addressee number of an unread message; when callback is initiated, detecting a number of a current SIM card, and if the number is not the called number, switching to a SIM card of the called number, or when message replying is initiated, detecting the number of the current SIM card, and if the number is not the addressee number, switching to a SIM card of the addressee number, and calling back via the switched SIM card or replying to the message via the switched SIM card.

9 Claims, 5 Drawing Sheets

(51) Int. Cl.
*H04M 3/42* (2006.01)
*H04L 29/12* (2006.01)
*H04W 88/06* (2009.01)

(58) Field of Classification Search
USPC .......... 455/432.3, 433, 432.1, 411, 436, 410, 455/566, 405
See application file for complete search history.

(56) References Cited

U.S. PATENT DOCUMENTS

| | | | | |
|---|---|---|---|---|
| 2012/0178500 A1* | 7/2012 | Hwang | ................. | H04W 8/183 455/558 |
| 2013/0137481 A1 | 5/2013 | Kim | | |
| 2013/0203426 A1* | 8/2013 | Harnay | ............... | H04W 76/026 455/450 |
| 2014/0302829 A1* | 10/2014 | Won | ..................... | H04M 3/436 455/415 |
| 2015/0017962 A1* | 1/2015 | Howard | ................. | H04W 8/22 455/418 |
| 2015/0312731 A1* | 10/2015 | Bendi | .................... | H04W 4/12 455/414.1 |

FOREIGN PATENT DOCUMENTS

| | | |
|---|---|---|
| CN | 102857903 A | 1/2013 |
| CN | 102857906 A | 1/2013 |
| CN | 102984338 A | 3/2013 |
| CN | 103052040 A | 4/2013 |
| CN | 103369506 A | 10/2013 |
| CN | 104158974 A | 11/2014 |

\* cited by examiner

METHOD AND DEVICE FOR SWITCHING SIM CARDS OF COMMUNICATION TERMINAL AND COMPUTER STORAGE MEDIUM

TECHNICAL FIELD

The disclosure relates to the technical field of communications, and in particular to a method and device for switching Subscriber Identity Module (SIM) cards of a communication terminal, and a computer storage medium.

BACKGROUND

Nowadays, the term "dual-SIM dual-standby" means that two SIM cards may be inserted into a mobile phone or other terminals, and can be standby simultaneously.

For example, a consumer may use telephone numbers for two Global System for Mobile Communication (GSM) networks simultaneously on a single GSM dual-SIM dual-standby mobile phone, and may use telephone numbers for two Code Division Multiple Access (CDMA) networks simultaneously on a single CDMA dual-card dual-standby mobile phone.

In general, dual-SIM dual-standby may be set to be one of the following cases.
 1. Only a SIM card 1 is active.
 2. Only a SIM card 2 is active.
 3. Both cards are active.

It may be understood that dual-SIM dual-standby enables the demand for communication of a user to be better met, and meanwhile, the communication cost is reduced.

From the perspective of technical implementation, there are several dual-SIM solutions on the market. One solution uses two sets of chips, i.e., two sets are installed in a mobile phone, each comprising a baseband chip, a radio frequency chip and a memory system, and two complete phone motherboards are combined and arranged in the same housing of the mobile phone. Another solution adds an analog switch to a traditional chipset of a mobile phone for manually switching networks. Yet another solution uses a software to manage a control Integrated Circuit (IC) chip to continuously switch between two networks for automatically searching for networks.

However, when an incoming call or a short message via different cards is replied, the mobile phone or other terminals using the above-mentioned solutions cannot match the reply to the incoming call or the message corresponding to a different card to a corresponding SIM card. For example, when an opposite party sends a short message to the SIM card 2 and the SIM card 1 of the mobile phone is set as a primary SIM card, the SIM card 1 may be unknown to the opposite party during the reply, and in order to switch to a number capable of being identified by the opposite party, the user needs to manually switch.

SUMMARY

In view of this, the embodiments of the disclosure are intended to provide a method and device for switching SIM cards of a communication terminal, and a computer storage medium, for solving the existing problem that the reply to an incoming call or a message cannot be matched to a corresponding card during a callback or message reply in the existing dual-SIM technology.

To this end, the technical solution in the disclosure for solving the above-mentioned problem is as follows.

The embodiment of the disclosure provides a method for switching SIM cards of a communication terminal, which includes the following steps:

a called number, which has been called by a missed call, is identified, or an addressee number of an unread message is identified;

when a callback is initiated, a number of a current SIM card is detected, and when the number of the current SIM card is not the called number, the current SIM card is switched to a SIM card having the called number, or when a message reply is initiated, the number of the current SIM card is detected, and when the number of the current SIM card is not the addressee number, the current SIM card is switched to a SIM card of the addressee number;

the callback is performed via the SIM card having the called number or the message is replied via the SIM card having the addressee number.

In the above-mentioned solution, the step that the called number, which has been called by the missed call, is identified includes that:

when an incoming call is received, a first SIM card having a called number called by the incoming call is detected and recorded, and when the incoming call is missed, a first association between the generated missed call and the first SIM card is established and stored.

The step that the addressee number of the unread message is identified specifically includes that:

when a message is received, a second SIM card having an addressee number of the message is detected and recorded, and when the received message has not been replied, a second association between the generated unread message and the second SIM card is established and is stored.

In the above-mentioned solution, the step that the number of the SIM card is detected when the callback is initiated specifically includes that:

when callback is initiated, the first association is retrieved and parsed, it is determined whether the SIM card is the same as the first SIM card in the first association, when the current SIM card is the same as the first SIM card in the first association, a callback process is created, and when the current SIM card is different from the first SIM card in the first association, the current SIM card is switched to the SIM card of the called number; and when the message reply is initiated, the second association is retrieved and parsed, it is determined whether the current SIM card is the same as the second SIM card in the second association, when the current SIM card is the same as the first SIM card in the first association, a message reply process is created, and when the current SIM card is different from the first SIM card in the first association, the current SIM card is switched to the SIM card having the addressee number.

In the above-mentioned solution, after the callback is performed via the switched SIM card or the message is replied via the switched SIM card, the method includes that:

the SIM card having the called number of the SIM card having the addressee number is switched back to the original SIM card, and the first association and the second association are removed.

In the above-mentioned solution, after the first association and the second association are removed, the method further includes that:

a first index is created in a contact directory in which contact entries in the contact directory are bound to the SIM card corresponding to the contact entries according to call records, and a second index is created in the contact directory in which the contact entries in the contact directory are bound to the SIM card corresponding to the contact entries according to message records; and after the contact entries are bound, when a missed call corresponding to one of the contact entries is detected to be generated, a system background is triggered to bind the generated missed call to the SIM card corresponding to the contact entry; or when an unread message corresponding to one of the contact entries are generated, the system background is triggered to bind the generated unread message to the SIM card corresponding to the contact entry.

The embodiment of the disclosure also provides a device for switching SIM cards of a communication terminal, which includes:

a number identification module, configured to identify a called number, which has been called by a missed call, or identify an addressee number of an unread message;

a SIM card switching module, configured to detect, when a callback is initiated, a number of a current SIM card, and when the number of the current SIM card is not the called number, switch from the current SIM card to a SIM card having the called number, or when a message reply is initiated, detect the number of the current SIM card, and when the number of the current SIM card is not the addressee number, switch from the current SIM card to a SIM card having the addressee number and a processing module, configured to call back via the SIM card having the called number or reply to the message via the SIM card having the addressee number.

In the above-mentioned solution, the number identification module includes a missed call preprocessing unit and an unread message preprocessing unit, wherein the missed call preprocessing unit is configured to detect and record, when an incoming call is received, a first SIM card having a current called number called by the incoming call, and when the incoming call is missed, establish and store a first association between the generated missed call and the first SIM card; and the unread message preprocessing unit is configured to detect and record, when a message is received, a second SIM card having an addressee number of the message, and when the received message has not been replied, establish and store a second association between the generated unread message and the second SIM card.

In the above-mentioned solution, the SIM card switching module includes a first determination unit and a second determination unit, wherein the first determination unit is configured to retrieve and parse, when the callback is initiated, the first association, determine whether the current SIM card is the same as the first SIM card in the first association, when the current SIM card is the same as the first SIM card in the first association, create a callback process, and when the current SIM card is different from the first SIM card in the first association, switch from the current SIM card to the SIM card having the called number, and the second determination unit is configured to retrieve and parse, when the message reply is initiated, the second association, determine whether the current SIM card is the same as the second SIM card in the second association, when the current SIM card is the same as the second SIM card in the second association, create a message reply process, and when the current SIM card is different from the second SIM card in the second association, switch from the current SIM card to the SIM card having the addressee number.

In the above-mentioned solution, the device further includes a SIM card restoration module, configured to switch from the SIM card back having the called number or the SIM card having the addressee number to the original SIM card, and remove the first association and the second association.

In the above-mentioned solution, the device further includes a SIM card binding module, configured to: create, in a contact directory, a first index in which contact entries in the contact directory are bound to the SIM card corresponding to the contact entries according to call records, and create, in the contact directory, a second index in which the contact entries in the contact directory are bound to the SIM card corresponding to the contact entries according to call records and message records; and after the contact entries are bound, when a missed call corresponding to one of the contact entries is detected to be generated, trigger a system background to bind the generated missed call to the SIM card corresponding to the contact entry; or when an unread message corresponding to one of the contact entries is detected to be generated, trigger the system background to bind the generated missed call to the SIM card corresponding to the contact entry.

The embodiment of the disclosure provides a computer storage medium having stored thereon a computer program for executing the above-mentioned method for switching SIM cards of a communication terminal.

The embodiments of the disclosure are intended to provide the method and apparatus for switching SIM cards of a communication terminal and the computer storage medium. A called number of a missed call is identified, or an addressee number of an unread message is identified. A current SIM card is switched to a SIM card of the called number, or the current SIM card is switched to a SIM card of the addressee number. Callback is performed via the switched SIM card or the message is replied via the switched SIM card. Thus, the reply to an incoming call or a message corresponding to a different SIM card can be matched to a corresponding SIM card during a callback or message reply, thereby eliminating switching operations by a user and improving the user experience.

DETAILED DESCRIPTION

In order to make technical problem to be solved, technical solution and beneficial effects of the disclosure clearer, the disclosure will be further elaborated below with the drawings and the embodiments. It will be appreciated that detailed descriptions here are only intended to explain the disclosure without limiting the disclosure.

Embodiment 1

Figure 1:
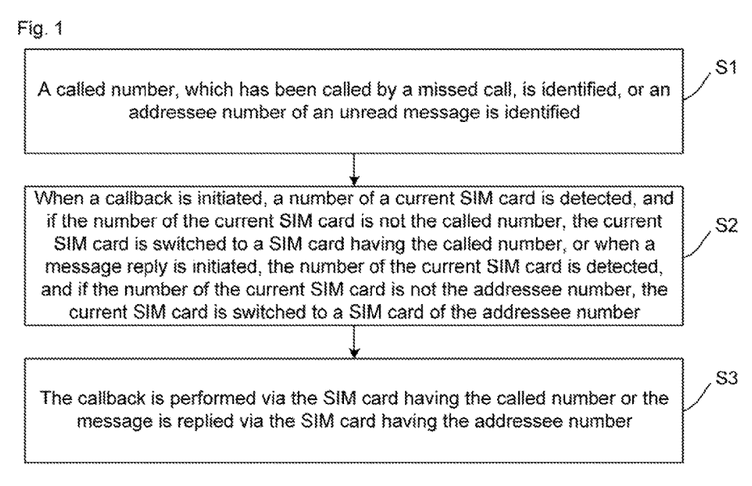
FIG. 1 is a flowchart of a method for switching SIM cards of a communication terminal according to an embodiment of the disclosure.

FIG. 1 is a flowchart of a method for switching SIM cards of a communication terminal according to an embodiment of the disclosure. The method includes the following steps.

S1: A called number, which has been called by a missed call, is identified, or an addressee number of an unread message is identified.

For example, when a missed call or an unread message is detected by a system background of a dual-SIM mobile phone, the missed call or the unread message is extracted and analyzed, a called number called by the missed call is identified, or an addressee number of the unread message is identified.

S2: When a callback is initiated, a number of a current SIM card is detected, and if the number of the current SIM card is not the called number, the current SIM card is switched to a SIM card having the called number, or when a message reply is initiated, the number of the current SIM card is detected, and if the number of the current SIM card is not the addressee number, the current SIM card is switched to a SIM card of the addressee number.

It may be understood that the method is applied to a dual-SIM mobile phone or other dual-SIM terminals, and also applied to a multi-SIM mobile phone or other multi-SIM terminals.

S3: The callback is performed via the SIM card having the called number or the message is replied via the SIM card having the addressee number.

When a call process for callback is initiated, the callback is performed via the SIM card having the called number; and when a message process for message reply is initiated, the message is replied via the SIM card having the addressee number. It may be understood that the switching operation in this step is performed at a moment prior to the callback, or performed at a moment prior to the message reply, and is triggered by a callback event or a reply event.

By means of the present embodiment, a called number of a missed call is identified, or an addressee number of an unread message is identified; a current SIM card is switched to a SIM card of the called number, or the current SIM card is switched to a SIM card of the addressee number; and the callback is performed via the SIM card having the called number or the message is replied via the SIM card having the addressee number. Thus, the reply to an incoming call or a message corresponding to a different SIM card can be matched to a corresponding SIM card during a callback or message reply, thereby eliminating switching operations by a user and improving the user experience.

Embodiment 2

Figure 2:
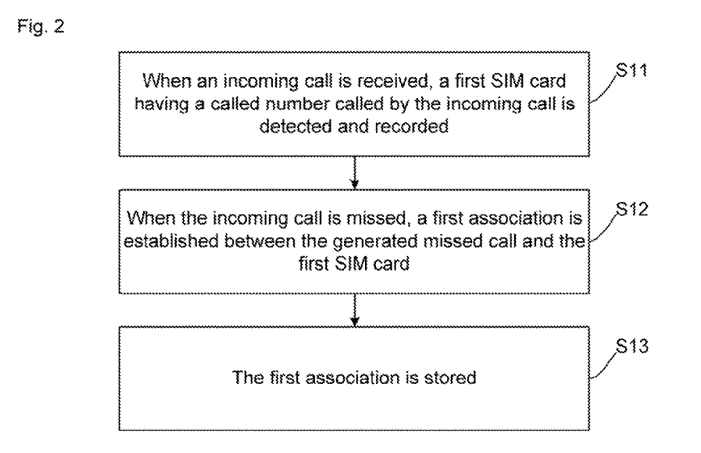
FIG. 2 is a flowchart of a step of identifying a called number of a missed call as shown in FIG. 1.

FIG. 2 is a flowchart of a step of identifying a called number of a missed call as shown in FIG. 1. The present embodiment specifically describes, based on the previous embodiment, the step of identifying a called number of a missed call as follows.

S11: When an incoming call is received, a first SIM card having a called number called by the incoming call is detected and recorded.

As mentioned in the previous embodiment, a SIM card A and a SIM card B are inserted into a dual-SIM mobile phone. When a missed call for the SIM card A exists, the missed call is detected, and information of the SIM card A is recorded. It may be understood that a call monitoring process is created at a system background, and the call monitoring process monitors information of the missed call and records information of a corresponding SIM card according to the information of the missed call.

S12: When the incoming call is missed, a first association is established between the generated missed call and the first SIM card.

As mentioned in the previous embodiment, an association database is established, and association rules, e.g., correspondence between contact entries and SIM cards, are stored in the association database. By retrieving the association rules in the association database, the first association is established.

S13: The first association is stored.

In an embodiment, the established first association is stored in the association database.

In the implementation of this embodiment, the first association is established and stored between the generated missed call and the first SIM card, thereby realizing correspondence between a called number and a corresponding SIM card, and avoiding the chaotic usage of multiple cards in a callback process for a missed call.

Embodiment 3

Figure 3:
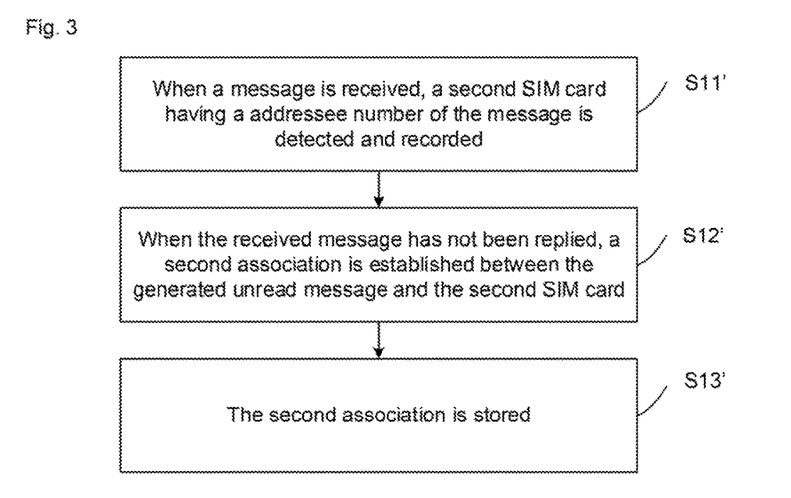
FIG. 3 is a flowchart of a step of identifying an addressee number of an unread message as shown in FIG. 1.

FIG. 3 is a flowchart of a step of identifying an addressee number of an unread message as shown in FIG. 1. The present embodiment specifically describes, based on embodiment 1, the step of identifying an addressee number of an unread message as follows.

S11': When a message is received, a second SIM card having a addressee number of the message is detected and recorded.

As mentioned in the previous embodiment, when an unread message from a SIM card A is received, the unread message is detected, and information of the SIM card A is recorded. It may be understood that a message monitoring process is created at a system background, and the message monitoring process monitors an unread message and records corresponding information of a SIM card according to the unread message.

S12': When the received message has not been replied, a second association is established between the generated unread message and the second SIM card.

Likewise, an association database is established, and association rules, e.g., correspondence between contact entries and SIM cards, are stored in the association database. By retrieving the association rules in the association database, the second association is established. It may be understood that a call or message association rules, a first association and a second association are recorded in a same database, or respective association rules and corresponding associations are recorded in respective databases.

S13': The second association is stored.

The storage mode may refer to the previous embodiment, which will not be repeated herein.

In the implementation of the present embodiment, the second association between the generated unread message and the first SIM card is established and stored, thereby realizing correspondence between a number to which the message is sent and a corresponding SIM card, and avoiding the chaotic usage of multiple cards in a message reply process.

Embodiment 4

Figure 4:
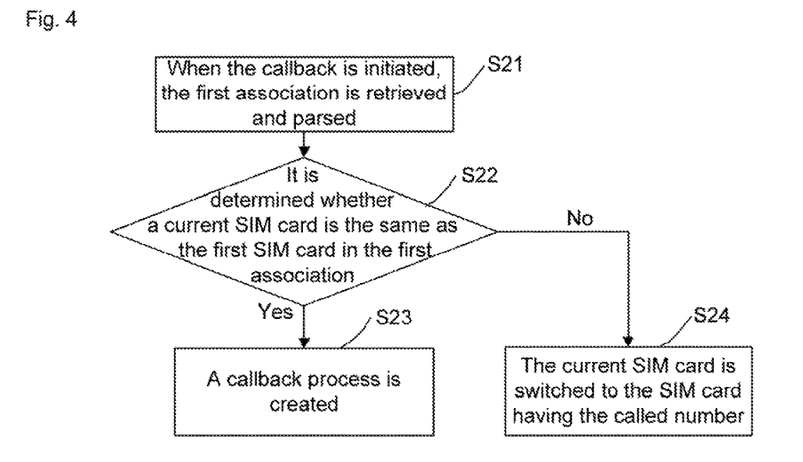
FIG. 4 is a flowchart of a step of detecting a number of a current SIM card when a callback is initiated as shown in FIG. 1.

FIG. 4 is a flowchart of a step of detecting a number of a current SIM card when a callback is initiated as shown in FIG. 1. The present embodiment specifically describes, based on embodiment 1, the step of detecting a number of a current SIM card when the callback is initiated as follows.

S21: When the callback is initiated, the first association is retrieved and parsed.

The first association includes a phone number of a missed call, a number of a SIM card and corresponding information of the SIM card. Another mode is that an index relationship is established in the first association, and the above-mentioned number and the information of the SIM card are acquired by means of the index relationship.

S22: It is determined whether a current SIM card is the same as the first SIM card in the first association, if so, step S23 is executed, and if not, step S24 is executed.

S23: A callback process is created.

S24: The current SIM card is switched to the SIM card having the called number.

In the implementation of the present embodiment, it is determined whether the current SIM card is the same as the first SIM card in the first association so as to determine whether it is necessary to switch SIM cards, thereby distinguishing the called number from the current SIM card in different situations.

Embodiment 5

Figure 5:
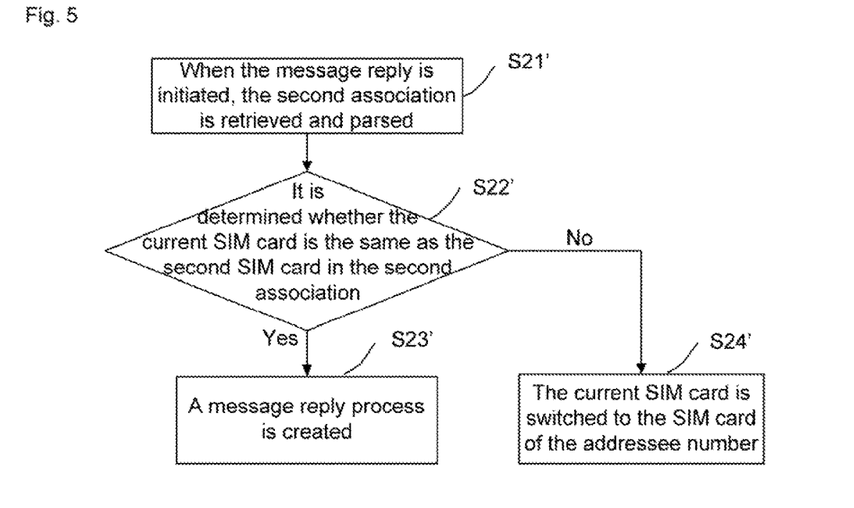
FIG. 5 is a flowchart of a step of detecting a number of a current SIM card when a message reply is initiated as shown in FIG. 1.

FIG. 5 is a flowchart of a step of detecting a number of a current SIM card when a message reply is initiated as shown in FIG. 1. The present embodiment specifically describes, based on embodiment 1, the step of detecting a number of a current SIM card when the message reply is initiated as follows.

S21': When the message reply is initiated, the second association is retrieved and parsed.

S22': It is determined whether the current SIM card is the same as the second SIM card in the second association, if so, step S23' is executed, and if not, step S24' is executed.

S23': A message reply process is created.

S24': The current SIM card is switched to the SIM card having the addressee number.

In the implementation of the present embodiment, it is determined whether the current SIM card is the same as the second SIM card in the second association so as to determine whether it is necessary to switch SIM cards, thereby distinguishing the number corresponding to the message which is replied from the current SIM card in different situations.

Embodiment 6

Figure 8:
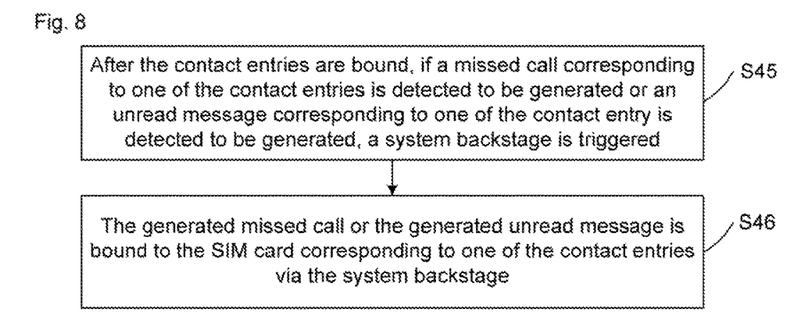
FIG. 8 is a flowchart of steps after removing a first association and a second association as shown in FIG. 7.

FIG. 8 is a flowchart of a step of calling back via a SIM card having the called number or replying to the message via a SIM card having the addressee number as shown in FIG. 1.

Based on the above embodiment, after the callback is performed via the SIM card having the called number or the message is replied via the SIM card having the addressee number, the method includes the following steps.

S41: The SIM card having the called number or the SIM card having the addressee number is switched back to the original SIM card.

S42: The first association and the second association are removed.

If the SIM card has not been switched, it is unnecessary to switch back to the original SIM card. Meanwhile, after the first association and the second association are removed, or the first association and the second association are exported from a association database to a storage apparatus, if an association is re-established, it is detected whether there is a change, if not, the association is directly retrieved in the storage apparatus, and if so, the association is updated.

Embodiment 7

Figure 6:
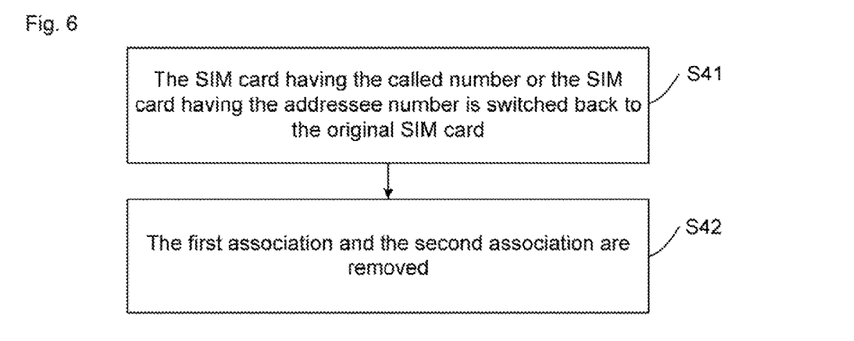
FIG. 6 is a flowchart of steps after calling back via a switched SIM card or replying to the message via a switched SIM card as shown in FIG. 1.
Figure 7:
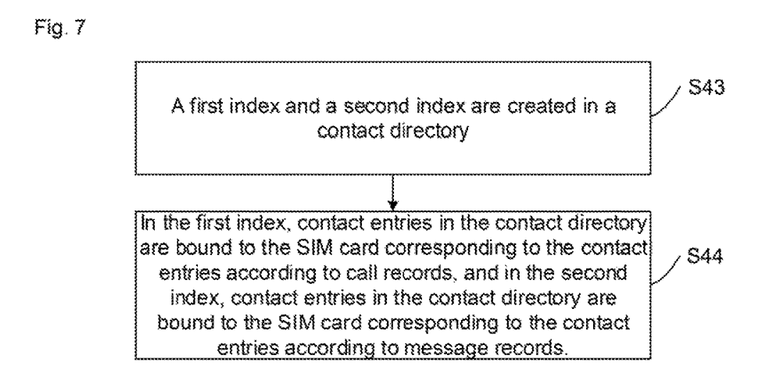
FIG. 7 is a flowchart of steps after removing a first association and a second association as shown in FIG. 6.

FIG. 7 is a flowchart of a step of removing a first association and a second association as shown in FIG. 6. Based on the above embodiment, after the first association and the second association are removed, the method further includes the following steps.

S43: A first index and a second index are created in a contact directory.

S44: In the first index, contact entries in the contact directory are bound to the SIM card corresponding to the contact entries according to call records, and in the second index, contact entries in the contact directory are bound to the SIM card corresponding to the contact entries according to message records.

Embodiment 8

FIG. 8 is a flowchart of a step of removing a first association and a second association as shown in FIG. 7. Based on embodiment 7, it includes the following steps:

S45: after the contact entries are bound, if a missed call corresponding to one of the contact entries is detected to be generated or an unread message corresponding to one of the contact entries is detected to be generated, a system background is triggered; and S46: the generated missed call or the generated unread message is bound to the SIM card corresponding to one of the contact entries via the system background.

Therefore, according to the present embodiment, by binding the generated missed call or the generated unread message to the SIM card corresponding to the contact entry, binding is performed at a moment of generating the missed call and of receiving the message, achieving better real-time performance higher accuracy. Meanwhile, it is unnecessary to perform determination and selection after an operation by a user, thereby improving the processing efficiency.

In the implementation of the method for switching SIM cards in the embodiments of the disclosure, a called number of a missed call is identified, or an addressee number of an unread message is identified; a current SIM card is switched to a SIM card of the called number, or the current SIM card is switched to a SIM card of the addressee number, and the callback is performed via the SIM card having the called number or the message is replied via the SIM card having the addressee number. Thus, the reply to an incoming call or a message corresponding to a different SIM card can be matched to a corresponding SIM card during a callback or message reply, thereby eliminating switching operations by a user and improving the user experience.

Correspondingly, the embodiments of the disclosure also provide a computer storage medium, in which a computer program is stored is used for implementing the above-mentioned method for switching SIM cards of a communication terminal.

Those of ordinary skill in the art may understand that all or some steps in various methods of the above-mentioned embodiment may be completed by instructing relevant hardware of a terminal device via a program, the program may be stored in a computer-readable storage medium, and the storage medium may include: a flash disk, a Read-Only Memory (ROM), a Random Access Memory (RAM), a magnetic disk or an optical disc.

Embodiment 9

Figure 9:
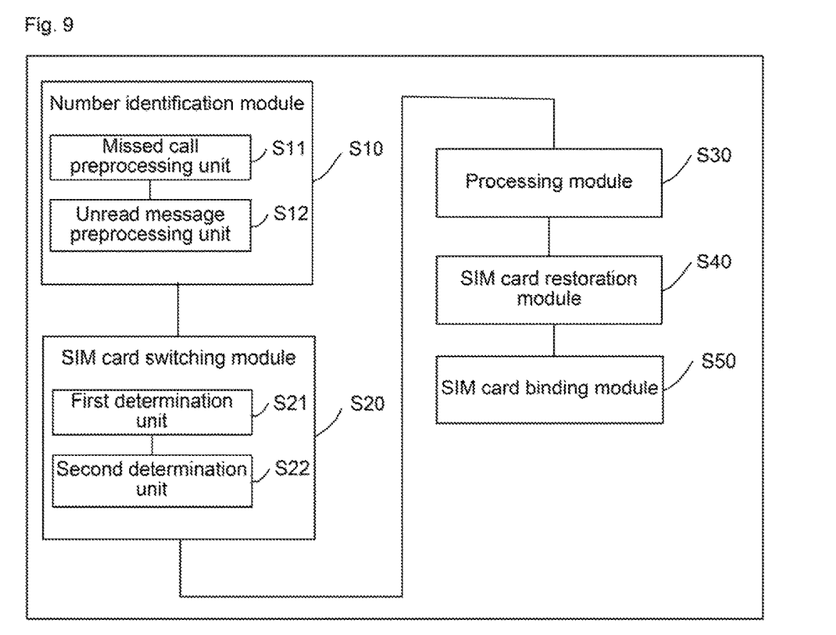
FIG. 9 is a block diagram of a structure of a device for switching SIM cards of a communication terminal according to an embodiment of the disclosure.

FIG. 9 is a structural diagram of a device for switching SIM cards of a communication terminal according to an embodiment of the disclosure. As shown in FIG. 9, the device includes:

a number identification module 10, which is configured to identify a called number, which has been called by a missed call, or identify an addressee number of an unread message;

a SIM card switching module 20, which is configured to detect, when a callback is initiated, a number of a current SIM card, and if the number of the current SIM card is not the called number, switch from the current SIM card to a SIM card having the called number, or when a message reply is initiated, detect the number of the current SIM card, and if the number of the current SIM card is not the addressee number, switch from the current SIM card to a SIM card having the addressee number; and a processing module 30, which is configured to call back via the SIM card having the called number or reply to the message via the SIM card having the addressee number.

In the above-mentioned solution, the number identification module 10 includes a missed call preprocessing unit 11 and an unread message preprocessing unit 12, wherein the missed call preprocessing unit 11 is configured to detect and record, when an incoming call is received, a first SIM card having a called number called by the incoming call, and when the incoming call is missed, establish and store a first association between the generated missed call and the first SIM card; and the unread message preprocessing unit 12 is configured to detect and record, when a message is received, a second SIM card having an addressee number of the message, and when the received message has not been replied, establish and store a second association between the generated unread message and the second SIM card.

In the above-mentioned solution, the SIM card switching module 20 includes a first determination unit 21 and a second determination unit 22, wherein the first determination unit 21 is configured to retrieve and parse, when the callback is initiated, the first association, determine whether the current SIM card is the same as the first SIM card in the first association, if the current SIM card is the same as the first SIM card in the first association, create a callback process, and if the current SIM card is different from the first SIM card in the first association, switch from the current SIM card to the SIM card having the called number; and the second determination unit 22 is configured to retrieve and parse, when the message reply is initiated, the second association, determine whether the current SIM card is the same as the second SIM card in the second association, if the current SIM card is the same as the second SIM card in the second association, create a message reply process, and if the current SIM card is different from the second SIM card in the second association, switch from the current SIM card to the SIM card having the addressee number.

In the above-mentioned solution, the device further includes a SIM card restoration module 40, which is configured to switch from the SIM card having the called number or the SIM card having the addressee number back to the original SIM card, and remove the first association and the second association.

In the above-mentioned solution, the device further includes a SIM card binding module 50, which is configured to: create a first index and a second index in a contact directory, and bind contact entries in the contact directory with the SIM card corresponding to the contact entries according to call records and message records; and after the contact entries are bound, if a missed call corresponding to one of the contact entries is detected to be generated, trigger a system background to bind the generated missed call to the SIM card corresponding to the contact entry; or when an unread message corresponding to one of the contact entries is detected to be generated, trigger the system background to bind the generated missed call to the SIM card corresponding to the contact entry.

The device for switching SIM cards may be used in a mobile phone or other communication terminals having a mobile phone communication function, such as, a smart phone and the like. Further, the device may be a software unit running in these communication terminals, or may be an independent pendant integrated into these communication terminals or may be ran in application systems of these mobile terminals.

It is noted that the technical features in the above method embodiment are correspondingly applied to the present device, which will not be repeated herein.

In practical application, each of the number identification module 10, the SIM card switching module 20, the processing module 30, the SIM card restoration module 40, the SIM card binding module 50, the missed call preprocessing unit 11, the unread message preprocessing unit 12, the first determination unit 21 and the second determination unit 22 may be implemented by a Central Processing Unit (CPU), a Micro Processor Unit (MPU), a Digital Signal Processor (DSP) or a Field Programmable Gate Array (FPGA) of the device for switching SIM cards of a communication terminal or an equipment containing the device for switching SIM cards of a communication terminal, respectively.

In the implementation of the device for switching SIM cards in the embodiments of the disclosure, a called number of a missed call is identified, or an addressee number of an unread message is identified; a current SIM card is switched to a SIM card of the called number, or the current SIM card is switched to a SIM card of the addressee number, and the callback is performed via the switched SIM card or the message is replied via the switched SIM card. Thus, the reply to an incoming call or a message corresponding to a different SIM card can be matched to a corresponding SIM card during a callback or message reply, thereby eliminating switching operations by a user and improving the user experience.

Those skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage media (including, but are not limited to, a disk memory, an optical memory and the like) containing computer available program codes may be adopted in the disclosure.

The disclosure is described with reference to flow charts and/or block diagrams of the method, the device (system) and the computer program product according to the embodiments of the disclosure. It will be appreciated that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flow charts and/or one or more blocks of the block diagrams.

The above drawings illustrate the preferred embodiments of the disclosure, and are not limited to the patent scope of the disclosure accordingly. Those skilled in the art may make various transformed solutions to implement the disclosure without departing from the scope and spirit of the disclosure. For example, features serving as an embodiment may be used for another embodiment to obtain a further embodiment. Any modifications, equivalent replacements and improvements made within the technical concept of the disclosure shall fall within the patent scope of the disclosure.

INDUSTRIAL APPLICABILITY

In the embodiments of the disclosure, a called number of a missed call is identified, or an addressee number of an unread message is identified; when a callback is initiated, a number of a current SIM card is detected, and if the number of the current SIM card is not the called number, the current SIM card is switched to a SIM card of the called number, or when a message reply is initiated, the number of the current SIM card is detected, and if the number of the current SIM card is not the addressee number, the current SIM card is switched to a SIM card of the addressee number, and the callback is performed via the switched SIM card or the message is replied via the switched SIM card. Thus, the reply to an incoming call or a message corresponding to a different SIM card can be matched to a corresponding SIM card during a callback or message reply, thereby eliminating switching operations by a user and improving the user experience.

What is claimed is:

1. A method for switching Subscriber Identity Module (SIM) cards of a communication terminal, comprising:
    identifying a called number, which has been called by a missed call, or identifying an addressee number of an unread message;
    when a callback is initiated, detecting a number of a current SIM card; and when the number of the current SIM card is not the called number, switching from the current SIM card to a SIM card having the called number, or when a message reply is initiated, detecting the number of the current SIM card, and when the number of the current SIM card is not the addressee number, switching from the current SIM card to a SIM card having the addressee number; and
    calling back via the SIM card having the called number or replying to the message via the SIM card having the addressee number,
    wherein:
    the step of identifying the called number, which has been called by the missed call comprises:
        when an incoming call is received, detecting and recording a first SIM card having a called number called by the incoming call, and when the incoming call is missed, establishing and storing a first association between the generated missed call and the first SIM card;
    the step of identifying the addressee number of the unread message comprises:
        when a message is received, detecting and recording a second SIM card having an addressee number of the message, and when the received message has not been replied, establishing and storing a second association between the generated unread message and the second SIM card;
    the step of detecting the number of the SIM card when the callback is initiated comprises:
        when the callback is initiated, retrieving and parsing the first association, determining whether the SIM card is the same as the first SIM card in the first association; when the current SIM card is the same as the first SIM card in the first association, creating a callback process; and when the current SIM card is different from the first SIM card in the first association, switching from the current SIM card to the SIM card having the called number; and
    the step of detecting the number of the current SIM card when the message reply is initiated comprises:
        when the message reply is initiated, retrieving and parsing the second association, determining whether the current SIM card is the same as the second SIM card in the second association; when the current SIM card is the same as the second SIM card in the second association, creating a message reply process; and when the current SIM card is different from the second SIM card in the second association, switching from the current SIM card to the SIM card having the addressee number.

2. The method according to claim 1, wherein after the callback is performed via the SIM card having the called number or the message is replied via the SIM card having the addressee number, the method comprises:
    switching from the SIM card having the called number or the SIM card having the address number back to the current SIM card, and removing the first association and the second association.

3. The method according to claim 2, wherein after removing the first association and the second association, the method further comprises:
    creating, in a contact directory, a first index in which contact entries in the contact directory are bound to the SIM card corresponding to the contact entries according to call records, and creating, in a contact directory, a second index in which the contact entries in the contact directory are bound to the SIM card corresponding to the contact entries according to message records; and after the contact entries are bound, when a missed call corresponding to one of the contact entries is detected to be generated, triggering a system background to bind the generated missed call to the SIM card corresponding to the contact entry; or when an unread message corresponding to one of the contact entries is detected to be generated, triggering the system background to bind the generated unread message to the SIM card corresponding to the contact entry.

4. A device for switching Subscriber Identity Module (SIM) cards of a communication terminal, comprising:
a processor; and
a memory for storing instructions executable by the processor,
wherein the processor is configured to:
identify a called number, which has been called by a missed call, or identify an addressee number of an unread message;
detect, when a callback is initiated, a number of a current SIM card; and when the number of the current SIM card is not the called number, switch from the current SIM card to a SIM card having the called number, or when a message reply is initiated, detect the number of the current SIM card, and when the number of the current SIM card is not the addressee number, switch from the current SIM card to a SIM card having the addressee number; and
call back via the SIM card having the called number or reply to the message via the SIM card having the addressee number,
wherein the processor is configured to:
  detect and record, when an incoming call is received, a first SIM card having a called number called by the incoming call, and when the incoming call is missed, establish and store a first association between the generated missed call and the first SIM card;
  detect and record, when a message is received, a second SIM card having an addressee number of the message, and when the received message has not been replied, establish and store a second association between the generated unread message and the second SIM card;
  retrieve and parse, when the callback is initiated, the first association, determine whether the current SIM card is the same as the first SIM card in the first association; when the current SIM card is the same as the first SIM card in the first association, create a callback process, and when the current SIM card is different from the first SIM card in the first association, switch from the current SIM card to the SIM card having the called number; and
  retrieve and parse, when the message reply is initiated, the second association, determine whether the current SIM card is the same as the second SIM card in the second association; when the current SIM card is the same as the second SIM card in the second association, create a message reply process, and when the current SIM card is different from the second SIM card in the second association, switch from the current SIM card to the SIM card having the addressee number.

5. The device according to claim 4, wherein the processor is further configured to:
switch from the SIM card having the called number or the SIM card having the addressee number back to the current SIM card, and remove the first association and the second association.

6. The device for switching SIM cards of a communication terminal according to claim 5, wherein the processor is further configured to:
create, in a contact directory, a first index in which contact entries in the contact directory are bound to the SIM card corresponding to the contact entries according to call records, and create, in the contact directory, a second index in which the contact entries in the contact directory are bound the SIM card corresponding to the contact entries according to message records; and after the contact entries are bound, when a missed call corresponding to one of the contact entries is detected to be generated, trigger a system background to bind the generated missed call to the SIM card corresponding to the contact entry; or when an unread message corresponding to one of the contact entries is detected to be generated, trigger the system background to bind the generated unread message to the SIM card corresponding to the contact entry.

7. A non-transitory computer storage medium having stored thereon computer-executable instructions for executing a method comprising:
identifying a called number, which has been called by a missed call, or identifying an addressee number of an unread message;
when a callback is initiated, detecting a number of a current SIM card; and when the number of the current SIM card is not the called number, switching from the current SIM card to a SIM card having the called number, or when a message reply is initiated, detecting the number of the current SIM card, and when the number of the current SIM card is not the addressee number, switching from the current SIM card to a SIM card having the addressee number; and
calling back via the SIM card having the called number or replying to the message via the SIM card having the addressee number,
wherein:
the step of identifying the called number, which has been called by the missed call comprises:
  when an incoming call is received, detecting and recording a first SIM card having a called number called by the incoming call, and when the incoming call is missed, establishing and storing a first association between the generated missed call and the first SIM card;
the step of identifying the addressee number of the unread message comprises:
  when a message is received, detecting and recording a second SIM card having an addressee number of the message, and when the received message has not been replied, establishing and storing a second association between the generated unread message and the second SIM card;
the step of detecting the number of the SIM card when the callback is initiated comprises:
  when the callback is initiated, retrieving and parsing the first association, determining whether the SIM card is the same as the first SIM card in the first association; when the current SIM card is the same as the first SIM card in the first association, creating a callback process; and when the current SIM card is different from the first SIM card in the first association, switching from the current SIM card to the SIM card having the called number; and the step of detecting the number of the current SIM card when the message reply is initiated comprises:

when the message reply is initiated, retrieving and parsing the second association, determining whether the current SIM card is the same as the second SIM card in the second association; when the current SIM card is the same as the second SIM card in the second association, creating a message reply process; and when the current SIM card is different from the second SIM card in the second association, switching from the current SIM card to the SIM card having the addressee number.

8. The non-transitory computer storage medium according to claim 7, wherein after the callback is performed via the SIM card having the called number or the message is replied via the SIM card having the addressee number, the method comprises:

switching from the SIM card having the called number or the SIM card having the address number back to the current SIM card, and removing the first association and the second association.

9. The non-transitory computer storage medium according to claim 8, wherein after the first association and the second association are removed, the method further comprises:

creating, in a contact directory, a first index in which contact entries in the contact directory are bound to the SIM card corresponding to the contact entries according to call records, and creating, in the contact directory, a second index in which the contact entries in the contact directory are bound to the SIM card corresponding to the contact entries according to message records; and after the contact entries are bound, when a missed call corresponding to one of the contact entries is detected to be generated, triggering a system background to bind the generated missed call to the SIM card corresponding to the contact entry; or when an unread message corresponding to one of the contact entries is detected to be generated, triggering the system background to bind the generated unread message to the SIM card corresponding to the contact entry.

* * * * *